United States Patent [19]

Penn et al.

[11] Patent Number: 4,873,473
[45] Date of Patent: Oct. 10, 1989

[54] MODULAR MOTOR CONTROLLER

[75] Inventors: Paul E. Penn, Indianapolis; Roger A. Werckman, Jr., Carmel; John W. Waymire, Indianapolis, all of Ind.

[73] Assignee: Dart Controls, Inc., Zionsville, Ind.

[21] Appl. No.: 149,624

[22] Filed: Jan. 28, 1988

[51] Int. Cl.⁴ .............................................. G05B 5/00
[52] U.S. Cl. .................................... 388/814; 318/603; 318/601; 388/917; 388/912
[58] Field of Search .................. 318/600-605, 318/615-618, 254, 306-318, 345, 606-607, 345 R, 345 A, 0.6

[56] References Cited

U.S. PATENT DOCUMENTS

| | | | |
|---|---|---|---|
| 3,229,182 | 1/1966 | Kubler | 318/331 |
| 3,470,437 | 9/1969 | Douglass | 318/345 |
| 3,475,672 | 10/1969 | Oltendorf | 318/317 |
| 3,518,519 | 6/1970 | Callan | 318/332 |
| 3,519,910 | 7/1970 | Pfaff et al. | 361/85 |
| 3,600,657 | 8/1971 | Pfaff | 318/218 |
| 3,601,673 | 8/1971 | Mason | 318/308 |
| 4,039,913 | 8/1977 | Clegg | 318/345 C |
| 4,074,175 | 2/1978 | Born et al. | 318/332 |
| 4,194,145 | 3/1980 | Ritter | 318/799 |
| 4,194,178 | 3/1980 | Dumbeck | 340/201 R |
| 4,328,447 | 5/1982 | Davis et al. | 318/331 |
| 4,376,915 | 3/1983 | Penn | 324/168 |
| 4,451,823 | 5/1984 | Penn et al. | 340/648 |
| 4,495,454 | 1/1985 | Collonia | 318/603 |
| 4,504,772 | 3/1985 | Matsuura et al. | 318/603 |
| 4,528,682 | 7/1985 | Nalcaoki | 318/603 |
| 4,544,868 | 10/1985 | Murty | 318/254 |
| 4,626,758 | 12/1986 | Takeuchi | 318/603 |

FOREIGN PATENT DOCUMENTS 0055146 10/1981 France .

Primary Examiner—William M. Shoop, Jr.
Assistant Examiner—David Martin
Attorney, Agent, or Firm—Barnes & Thornburg

[57] ABSTRACT

An apparatus for controlling a motor comprises an oscillator for providing a source of periodic signals, and a divider for converting the oscillator output into desired motor rotation frequency signals. A tachometer generates actual motor rotation frequency signals and a comparator compares the actual and desired motor rotation frequency signals and generates a rotation frequency error signal. The tachometer and the divider are coupled to the comparator. An SCR bridge controls motor rotation frequency. The comparator is coupled to the SCR bridge. An AND gate coupled to the source of periodic signals provides a counting gate during which periodic signals from any suitable source are to be counted and a counter coupled to the AND gate counts the periodic signals. A display displays the number of such periodic signals counted during the counting gate.

32 Claims, 4 Drawing Sheets

MODULAR MOTOR CONTROLLER

This invention relates to controllers for controlling the speeds of electric motors, such as, for example, brushless DC motors.

Various types of motor controllers are known. There are, for example, the controllers described in the following U.S. Pat. Nos.: 3,229,182; 3,470,437; 3,475,672; 3,518,519; 3,519,910; 3,600,657; 3,601,673; 4,039,913; 4,074,175; 4,194,145; 4,194,178; 4,328,447; 4,451,823; and 4,544,868. None of these, however, incorporates a microprocessor which facilitates variation of the motor control strategy. It is this variation of the motor control strategy which makes the present controller so versatile, permitting it to be adapted to control based upon different values of given motor control parameters, and indeed to a complete change to entirely different motor control parameters from one application to another.

According to one aspect of the invention, an apparatus for controlling a motor comprises an oscillator for providing a source of periodic signals, means for converting the oscillator output into desired motor rotation frequency signals, means for generating actual motor rotation frequency signals, means for comparing the actual and desired motor rotation frequency signals and for generating a rotation frequency error signal, means for controlling motor rotation frequency, and means for coupling the oscillator to the means for converting the oscillator output into desired motor rotation frequency signals. Means are provided for coupling the means for converting the oscillator output into desired motor rotation frequency signals to the means for comparing the actual and desired motor rotation frequency signals and for generating a rotation frequency error signal. Additional means couple the means for comparing the actual and desired motor rotation frequency signals and for generating a rotation frequency error signal to the means for controlling motor rotation frequency. Means are provided for coupling the means for generating actual motor rotation frequency signals to the means for comparing the actual and desired motor rotation frequency signals and for generating a rotation frequency error signal. Further means are provided for generating a counting gate. Additional means count signals. Means are provided for displaying the number of signals counted during the counting gate. Further means couple at least one of the means for generating a counting gate and the oscillator to the means for counting signals. Means are provided for coupling the signal count display means to the means for counting signals.

According to another aspect of the invention, apparatus for controlling the rotation frequency of an electric motor comprises an up/down (U/D) counter, a motor controller, means for coupling the U/D counter to the motor controller, means for generating first signals corresponding to actual motor rotation frequency, means for generating second signals corresponding to desired motor rotation frequency, means for generating a system constant corresponding to physical parameters of the apparatus, a first gate, a second gate, a clock, means for coupling the means for generating the first signals to the first gate, means for coupling the clock to the second gate, means for coupling the first gate to one of the UP and DOWN terminals of the U/D counter, means for coupling the second gate to the other of the UP and DOWN terminals of the U/D counter, means for coupling the means for generating a system constant to one of the first and second gates, and means for coupling the means for generating the second signals to the other of the first and second gates.

The invention may best be understood by referring to the following description and accompanying drawings which illustrate the invention. In the drawings.

Figure 1:
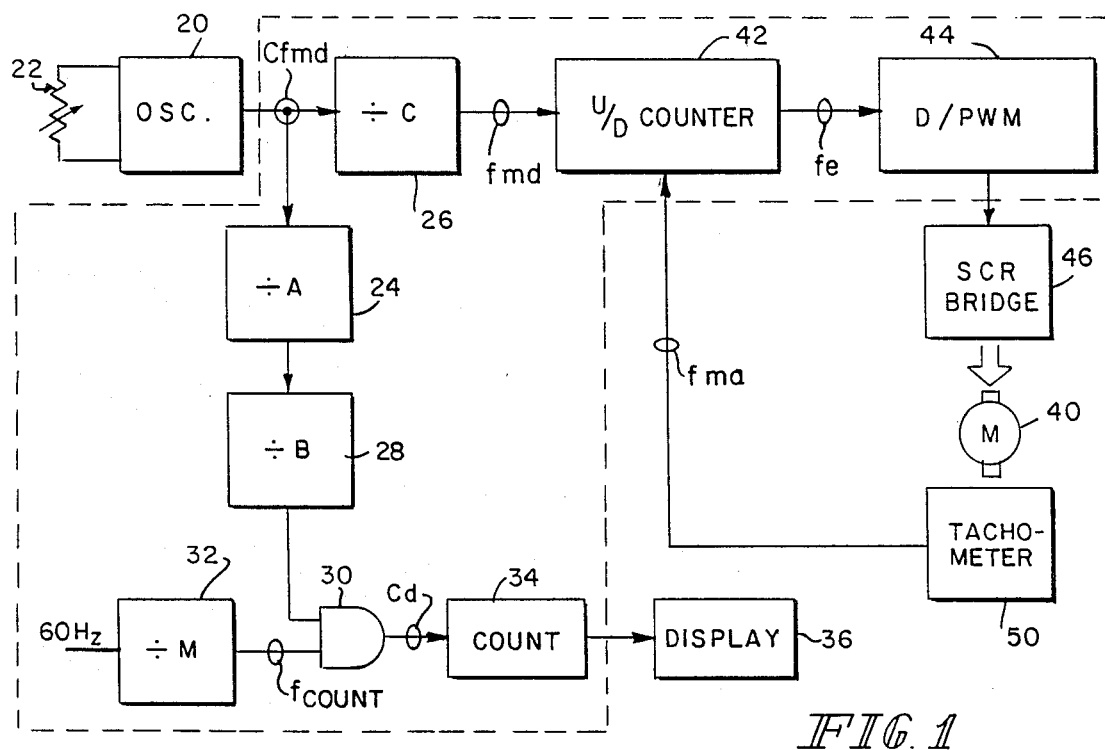
FIG. 1 illustrates a block diagram of a system constructed according to the invention.

Referring now to FIG. 1, an oscillator 20 controlled by a potentiometer 22 provides signals to a "divide-by-A" circuit 24 and a "divide-by-C" circuit 26, to both of which oscillator 20 is coupled. The oscillator output frequency, $Cf_{md}$, divided by A, a predetermined constant, is then further divided by a predetermined constant B in a "divide-by-B" circuit 28 which is coupled to circuit 24.

The output signal from circuit 28, $Cf_{md}/AB$, is supplied to one input terminal of an AND gate 30. A signal at an established, substantially invariant rate is provided to the remaining input terminal of AND gate 30. For purposes of the system of FIG. 1, that signal is the 60 Hz line divided by an appropriate predetermined constant M by a "divide-by-M" circuit 32 coupled between the line and a respective input terminal of AND gate 30.

The output terminal of AND gate 30 is coupled to a counter circuit 34, the output of which is displayed by a display circuit 36. The display is a display of a time, illustratively 8:30 or eight minutes, thirty seconds, which is the desired cycle time of a machine to which a motor 40 of the system of FIG. 1 is coupled and which is driven through its cycle by motor 40. Such a machine might be, for example, a continuous pizza baking oven with a conveyor onto which pizzas are placed for baking and from which baked pizzas are removed after the conveyor executes a cycle through the oven. In the example, the cycle would take eight minutes, thirty seconds.

To convert the oscillator 20 output frequency, $Cf_{md}$ into motor 40 drive signals, the output signal from divide-by-C circuit 26 is coupled to an "up-counting" input terminal of an up/down counter 42. The output terminal of up/down counter 42 is coupled to an input terminal of a digital-to-pulsewidth modulation converter (D/PWM) 44, the output terminal(s) of which is (are) coupled to the gate electrodes of SCRs in an SCR bridge 46 which supplies operating potential to the motor 40. A tachometer 50, such as, for example, the tachometer described in U.S. Pat. No. 4,376,915, generates pulses at the motor frequency, $f_{ma}$, and feeds these back to a "down-counting" input terminal of up/down counter 42. Counter 42 generates from these "up" and "down" input signals an error signal at an error frequency $f_e$. The D/PWM circuit 44 converts this error frequency $f_e$ into a firing phase angle for the SCRs in bridge 46 which corrects the motor 40 frequency to that necessary to provide the cycle time displayed on display 36.

The values of A, B, C and M can be calculated as follows, using the eight minute, thirty second cycle time example. The following relations hold true regardless of the values of A, B, C and M.

$$f_{osc} = Cf_{md},$$

$$f_e = f_{md} - f_{ma}, \text{ and}$$

$$c_d/f_{count} = Cf_{md}/AB$$

where: $f_{osc}$ is the oscillator 20 frequency; $c_d$ is the number of counts desired to be counted by counter 34 to be converted to a display on display circuit 36; and $f_{count}$ is the frequency of the signal to be counted, that is, the frequency of the output signal from divide-by-M circuit 32. The other parameters are as previously noted. Thus a relationship among the values of A, B and C can be obtained, namely $$Cf_{md}/AB = f_{count}/c_d.$$

In the example of eight minutes, thirty seconds cycle time with a 60 Hz input frequency to divide-by-M circuit 32 and M=½, $f_{count}$=60÷½=120 Hz, and $c_d$=8.5 min.×6 counts/min.=51 counts, $$AB = 51/120 \; Cf_{md}.$$

If it is further assumed that $f_{md}$=1000/60 Hz and C=120, $$AB = 120 \; (100/60) \; 51/120$$

$$AB = 1000 \times 51/60$$

$$AB = 850$$

then A and B can be conveniently chosen to be any pair of values that yield a product of 850, for example A=25 and B=34. Choosing these values will permit an oscillator frequency of 2 KHz to be divided down to 1000/60 Hz desired motor frequency $f_{md}$ for supply to the up input terminal of counter 42 to be counted against the actual motor frequency $f_{ma}$ to generate the motor frequency error $f_e$. This error is converted to D/PWM circuit 44 to a phase delay before the SCRs in bridge 46 are triggered. This controls the amount of energy supplied to the motor 40 so that the frequency error eventually reaches zero.

At the same time, the oscillator output frequency $Cf_{md}$=2 KHz is divided down to 120/51 to provide a gate width of 51/120 sec., the exact amount of time necessary to pass 51 output pulses from divide-by-M circuit 32 through AND gate 30 to count circuit 34 for conversion and display by display circuit 36 as 8:30 (eight minutes, thirty seconds).

Those components which can conveniently be implemented in a microprocessor are illustrated in FIG. 1 in broken lines. Such implementation makes changing the values of, for example, A, B, C and M a matter of merely changing specific program instructions stored in the microprocessor.

Figure 2:
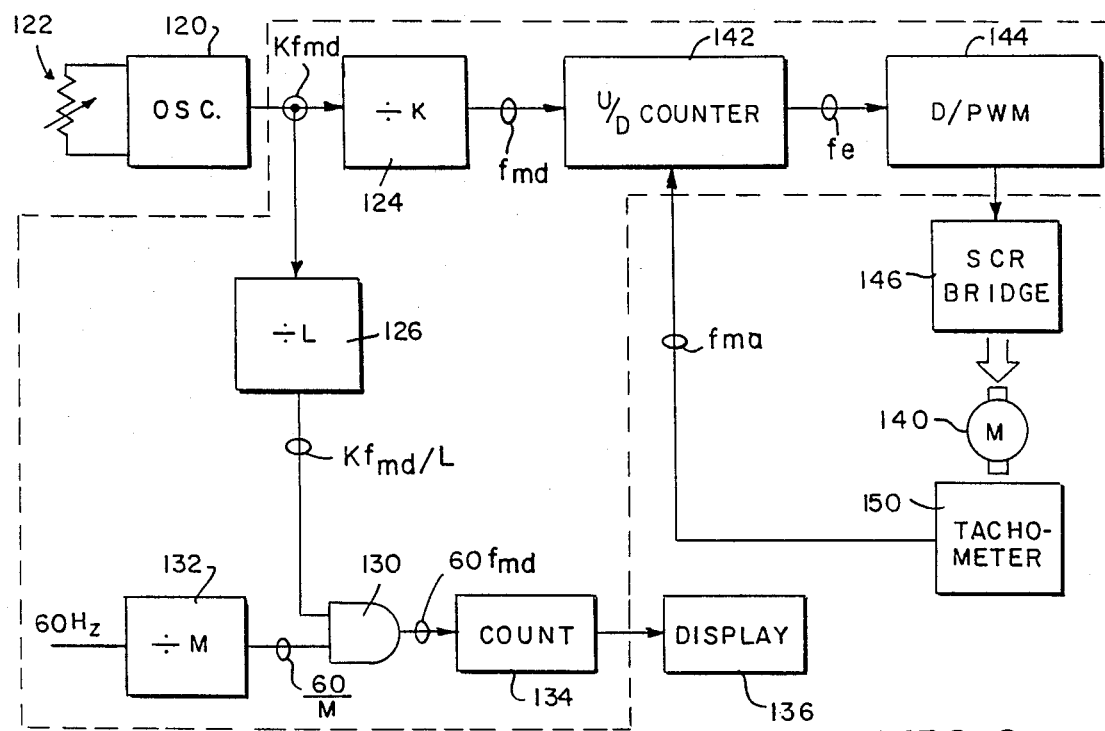
FIG. 2 illustrates a block diagram of a system constructed according to the invention.

Referring now to FIG. 2, an oscillator 120 is controlled by a potentiometer 122. Oscillator 120 provides signals to a "divide-by-K" circuit 124 and to a "divide-by-L" circuit 126, both of which are coupled to oscillator 120. The oscillator output frequency in this case 100 $f_{md}$, divided by L, a predetermined constant, is supplied to one input terminal of an AND gate 130. The reason for choosing the oscillator frequency to be 100 $f_{md}$ will become apparent as this description progresses. A signal at an established, substantially invariant rate is provided to the remaining input terminal of AND gate 130. In the system illustrated in FIG. 2 as in the system illustrated in FIG. 1, that signal is the 60 Hz line divided by an appropriate predetermined constant M by a "divide-by-M" circuit 132 coupled between the line and a respective input terminal of AND gate 130. The output terminal of AND gate 130 is coupled to a counter circuit 134, the output of which is displayed by a display circuit 136. The display in FIG. 2 is a display of a rotation rate, illustratively 1000 RPM, which is the desired frequency of a motor 140 of the system of FIG. 2. Motor 140 might drive, for example, a grain auger which feeds grain from a grain storage bin to a stock enclosure to feed stock housed in the enclosure.

To convert the oscillator 120 output frequency, $f_{md}$, into motor 140 drive signals, the output signal from divide-by-K circuit 126 is coupled to an up-counting input terminal of an up/down counter 142. The output terminal of up/down counter 142 is coupled to an input terminal of a D/PWM 144, the output terminal(s) of which is (are) coupled to the gate electrodes of SCRs in an SCR bridge 146 which supplies operating potential to the motor 140. A tachometer 150, again such as that described in U.S. Pat. No. 4,376,915, generates pulses at the motor frequency, $f_{ma}$, and these are fed back to a "down-counting" input terminal of up/down counter 142. Counter 142 generates from these "up" and "down" input signals an error signal of frequency $f_e$. The D/PWM circuit 144 converts this error frequency $f_e$ into a firing phase angle for the SCRs in bridge 146 which corrects the motor 140 frequency to that necessary to provide the motor frequency displayed on display 136.

The values of K, L and M can be calculated as follows, using the $f_{md}$=1000 RPM example. The following relations hold true regardless of the values of K, L and M.

$$f_{osc} = Kf_{md},$$

$$f_e = f_{md} - f_{ma}, \text{ and}$$

$$c_d = Kf_{md}/LW_g$$

where: $f_{osc}$ is the oscillator 120 frequency; $c_d$ is the number of counts desired to be counted by counter 134 to be converted to a display on display circuit 136; and $W_g$ is the width in seconds of the gate provided by AND gate 130 during which the $c_d$ counts are counted. It will be appreciated that since $c_d$ is typically desired to be an RPM of motor 140, it will be necessary to make $W_g$ sufficiently long that 60 $f_{md}$ $_m$pulses can be counted. That is, $$c_d = 60 f_{md}.$$

Also, since the drive signal to divide-by-M circuit 132 is at 60 Hz, $$W_g = 60/M.$$

The following relation can also be written:

$$c_dKf_{md}/LW_g.$$

Therefore, $$KM = 3600L.$$

It will be appreciated that if K is chosen to be 100, as it has been in the above example, and M is set equal to 36, then L can be set equal to 1.

The system of FIG. 2 thus results in an oscillator 120 frequency of 100 times the desired motor 140 frequency, with the desired motor 140 frequency being displayed in RPM on display 136. In the example, if a motor frequency of 1000/60 Hz is desired, the oscillator 120 output frequency is adjusted to 100/60 KHz. This results in a $f_{md}$ of 1/60 KHz or 1000/60 Hz being supplied to up/down counter 142, and a 100/60 KHz signal being supplied to one input terminal of AND gate 130. The signal supplied to the other input terminal of AND gate 130 has a width of 36/60 sec., which permits 36/60×1000,000/60=1000 pulses to be counted during the gated interval. This corresponds to 60 $f_{md}$, the desired motor 140 RPM.

Those components which can conveniently be implemented in a microprocessor are illustrated in FIG. 2 in broken lines. Such an implementation makes changing the values of, for example, K, L and M a matter of merely changing specific program instructions stored in the microprocessor.

Figure 3:
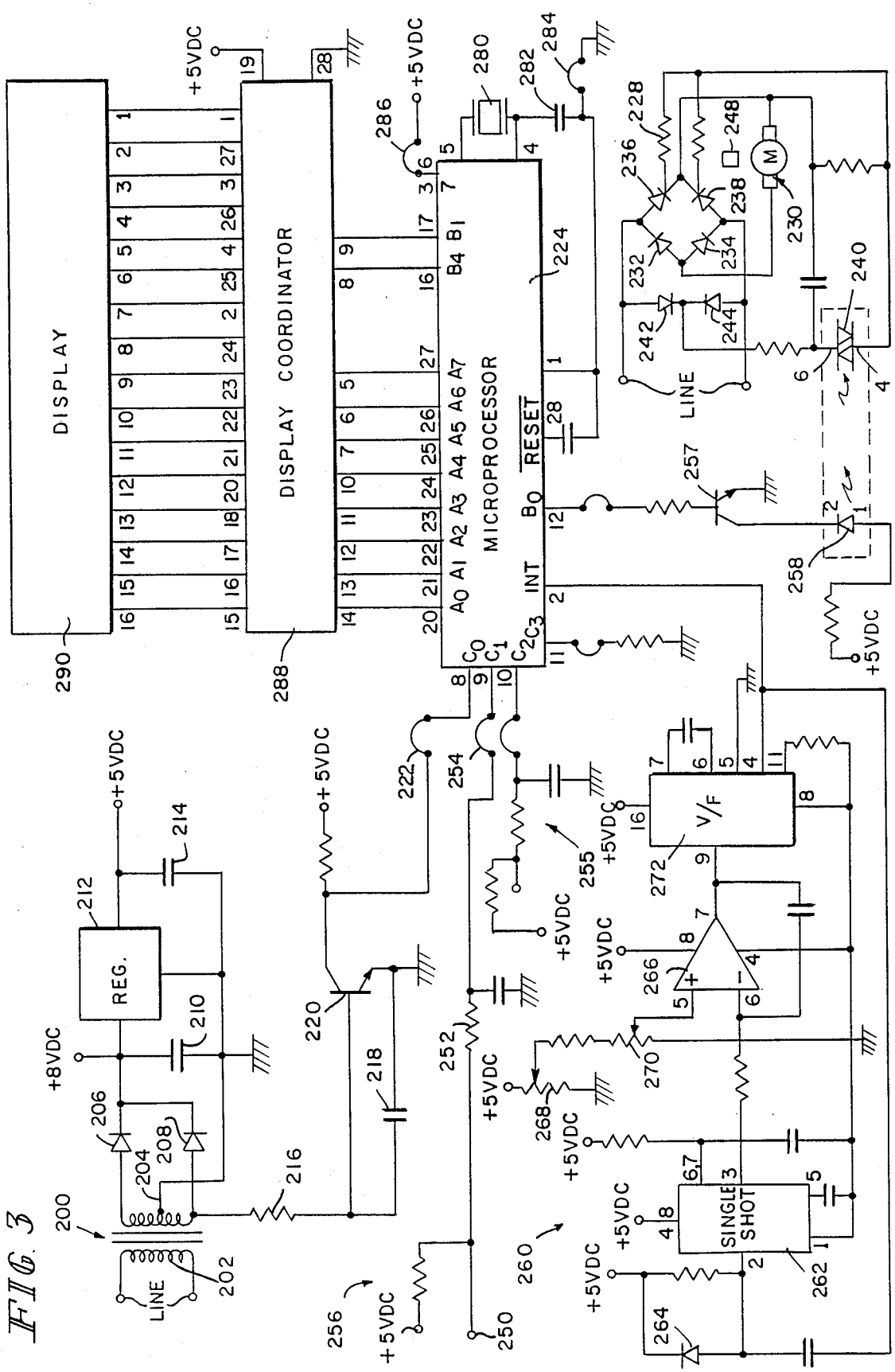
FIG. 3 illustrates a somewhat more detailed partly block and partly schematic diagram of a system constructed according to the invention.

Referring now particularly to FIG. 3, a circuit for implementing the various functions illustrated by the block diagrams of FIGS. 1–2 includes a transformer 200, the primary winding 202 of which is coupled across a 120 VAC line. The voltage variations appearing across the secondary winding 204 of transformer 200 is full wave rectified by oppositely poled diodes 206, 208, the anodes of which are coupled to opposite terminals of winding 204 and the cathodes of which are joined. A 1000 μF, 16 V storage capacitor 210 is coupled between the joined cathodes of diodes 206, 208 and a center tap of winding 204. +8 VDC appears across capacitor 210. The center tap of winding 204 is coupled to the circuit common. +8 VDC is coupled to an input terminal of an integrated circuit +5 VDC regulator 212. The common terminal of regulator 212 is coupled to common. The output terminal of regulator 212 provides regulated +5 VDC. A 150 μF storage capacitor 214 is coupled between the output and common terminals of regulator 212. Regulator 212 illustratively is a National Semiconductor type LM 7805+5 VDC integrated circuit power supply.

A series 47K resistor 216 and 0.01 μF capacitor 218 are coupled between the anode of diode 208 and common. The junction of resistor 216 and capacitor 218 is coupled to the base of a transistor 220 which illustratively is a type 2N4124 transistor. The emitter of transistor 220 is coupled to common. Its collector is coupled through a 4.7K load resistor to +5 VDC and through a jumper 222 to an input terminal $C_0$, pin 8, of a microprocessor 224. Transistor 220 and its associated components form a pulse-shaping circuit. Microprocessor 224 illustratively is a Motorola type MC68705 P3 integrated circuit microprocessor.

An SCR bridge 228 and motor 230 in series are also coupled across the 120 VAC line. The bridge 228 includes two diodes 232, 234 whose anodes are joined and whose cathodes are coupled to respective terminals of the line. The anode of an SCR 236 of the bridge 228 is coupled to the cathode of diode 232. The anode of an SCR 238 is coupled to the cathode of diode 234. The cathodes of SCRs 236, 238 are joined. SCRs 236, 238 illustratively are Tecor type S6015L52 SCRs. Motor 230 is coupled across the joined cathodes of SCRs 236, 238 and the joined anodes of diodes 232, 234. The gates of SCRs 236, 238 are coupled through respective 390 ohm resistors to one terminal, pin 4, of an optically triggerable DIAC 240. Pin 4 of DIAC 240 is coupled through a 1 K resistor to the joined cathodes of SCRs 236, 238. Another terminal, pin 6, of DIAC 240 is coupled through a 470 ohm resistor to the joined cathodes of two diodes 242, 244. The anode of diode 242 is coupled to one terminal of the line. The anode of diode 244 is coupled to the other terminal of the line. Pin 6 of DIAC 240 is coupled through a 0.001 μF, 1 KV capacitor to the common terminal of SCRs 236, 238.

The circuitry associated with the gate electrodes of SCRs 236, 238 is the triggering wave shaping circuitry for these SCRs. Triggering pulses provided by this circuitry determine the condition times of SCRs 236, 238 and therefore the energy supplied to motor 230.

A tachometer 248 associated with motor 230 provides a signal at terminal 250. Terminal 250 is coupled through a 2.2K resistor to +5 VDC and through a 2.2K resistor 252 to a jumper 254. The jumper 254 is coupled to an input terminal $C_1$, pin 9, of microprocessor 224. The common terminal of resistor 252 and jumper 254 is coupled through a 0.01 μF capacitor to common. Another circuit 255 identical to the tachometer pulse shaping circuit 256 is provided from an input terminal $C_2$, pin 10, of microprocessor 224. Terminal $C_3$, pin 11, of microprocessor 224 is coupled through a jumper and a 10K resistor to common. Circuit 255 can be used as a spare or as an input from a different tachometer similar to tachometer 248, for example, in a two-motor master/slave motor system. Tachometer 248 is of the type described in U.S. Pat. No. 4,376,915.

An output terminal $B_o$, pin 12, of microprocessor 224 is coupled through a jumper and a 47K resistor to the base of a transistor 257 which illustratively is a type 2N6426 transistor. The emitter of transistor 257 is coupled to common. Its collector is coupled to a pin 2 (cathode) of a LED 258. The anode, pin 1, of LED 258 is coupled through a 150 ohm resistor to +5 VDC. DIAC 240 and LED 258 can be combined into a single package such as the Motorola OPT 3009 optical coupler. This is illustrated by the broken lines in FIG. 3.

A precision oscillator 260 includes a single-shot integrated circuit 262 such as the type ICM7555 integrated circuit available from Intersil. Pin 2 of circuit 262 is coupled through a 10K resistor to +5 VDC, and to the anode of a diode 264, the cathode of which is coupled to +5 VDC. Pins 4, 8 of circuit 262 are coupled to +5 VDC. Pins 6, 7 of circuit 262 are coupled through a 1K resistor to +5 VDC and through a 0.068 μF capacitor to common. Pin 1 of circuit 262 is coupled to common. Pin 5 of circuit 262 is coupled through a 0.1 μF capacitor to common.

Pin 3, the output terminal, of circuit 262 is coupled through a 100K resistor to the inverting (−) input terminal of a difference amplifier 266. A 5K "set speed" potentiometer 268 is coupled between +5 VDC and common. The wiper of potentiometer 268 is coupled through a 47K resistor and a 20K "maximum speed" potentiometer 270 in series to common. The wiper of potentiometer 270 is coupled to the non-inverting (+) input terminal of difference amplifier 266. Feedback is provided from the output terminal, pin 7, of amplifier 266 through a 0.1 µF capacitor to its − input terminal. Amplifier 266 illustratively is a National Semiconductor type LM358 amplifier.

The output terminal of amplifier 266 is coupled to an input terminal, pin 9, of an integrated voltage-to-frequency converter (V/F) 272 such as the Motorola type CD4046 integrated circuit V/F. Pin 16 of V/F 272 is coupled to +5 VDC. Pins 6 and 7 of V/F 272 are coupled by a 0.01 µF capacitor. Pins 5, 8 of V/F 272 are coupled to common. Pin 11 of V/F 272 is coupled through a 1K resistor to common. Pin 4 of V/F 272 is coupled to the INT terminal, pin 2, of microprocessor 224. Feedback from pin 4 of V/F 272 is coupled through a 0.001 µF capacitor to pin 2 of single-shot 262.

The miroprocessor 224 clock is provided by a 4 MHz crystal 280 coupled across pins 4, 5 of microprocessor 224. Pin 4 is also coupled through a 20 pF capacitor 282 and a jumper 284 to common. The RESET terminal, pin 28, of microprocessor 224 is coupled through a 2.2 µF, 50 V capacitor to the junction of capacitor 282 and jumper 284. Pins 1, 7 of microprocessor 224 are also coupled to this junction. Pins 3, 6 of microprocessor 224 are jumpered (286) to +5 VDC.

The display circuit of FIG. 3 includes an integrated circuit display coordinator 288 such as the Maxim type ICM 7218 BIPI display coordinator. The display also includes a seven-segment display 290 such as the Litronix MAN 6980 display. Terminals $A_0$–$A_7$, pins 20–27, respectively, of microprocessor 224 are coupled, respectively, to pins 14–10, 7–5 of display coordinator 288. Terminals $B_4$,$B_1$, pins 16–17 respectively, of microprocessor 224 are coupled to pins 8–9, respectively, of display coordinator 288. Pin 19 of display coordinator 288 is coupled to +5 VDC. Pin 28 of display coordinator 288 is coupled to common. Pins 15–18, 20–24, 2, 25, 4, 26, 3, 27, and 1, respectively, of display coordinator 288 are coupled to pins 16–1, respectively, of display 290. These are terminals dp, a, b, d, c, e-g, 8, 6, 2, 1, 5, 3, 7, and 4, respectively, of display 290.

The microprocessor-based implementation of the motor control permits substantial flexibility in the selection of the various constants which establish the relationships among the oscillator frequency, line frequency, motor RPM and display count window. In addition, this implementation facilitates convenient packaging of the control system. For example, the illustrated systems can be packaged in so-called ⅛ DIN packages.

Figure 4:
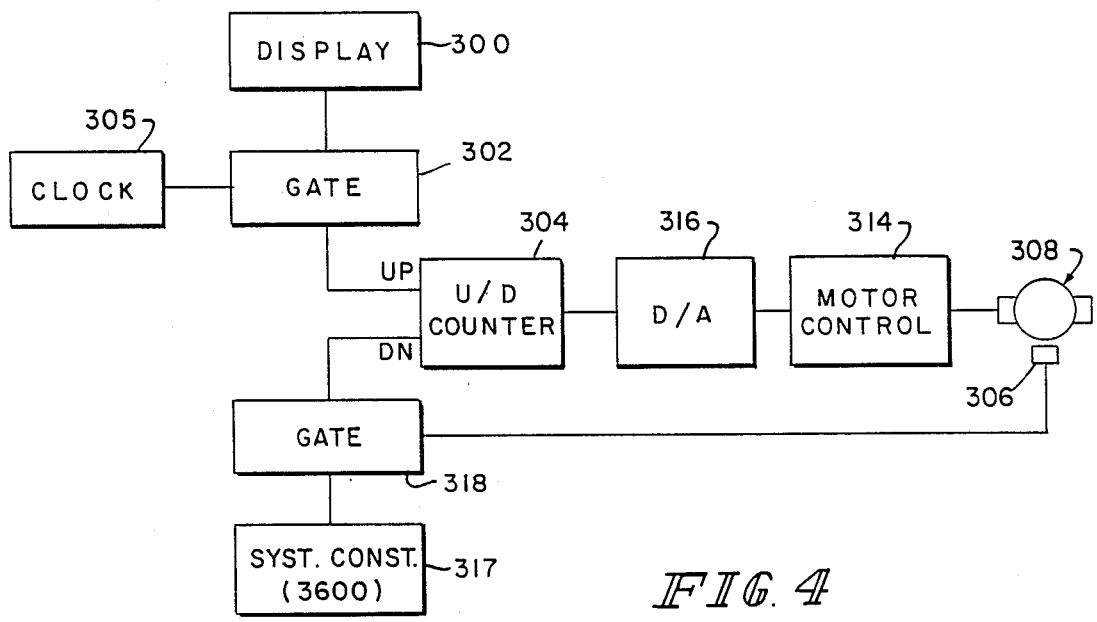
FIG. 4 illustrates a block diagram of a system constructed according to the invention.

Another implementation of the present invention can best be understood by referring to the block diagram of FIG. 4. In that implementation, the display of the desired rotation frequency itself is compared to the actual motor frequency. This removes from the control scheme any error which might occur in the oscillator (desired motor) frequency by removing the desired motor frequency oscillator entirely from the system. The system of FIG. 4 achieves this end by using the system's own internal clock and some switches, such as pushbuttons or the like, to generate and revise the display. The display itself is then read directly into the system and compared to the actual motor frequency or a number related to the actual motor frequency.

In FIG. 4, a four-digit display 300 of the desired motor rotation frequency is coupled through a gate 302 to the UP input terminal of a U/D counter 304. At regular intervals, illustratively every 1/60 second or 3600 times per minute as determined by a clock 305, whatever is in the display 300 is added to the counts in U/D counter 304. 3600 counts are subtracted from the counts in counter 304 each time a tachometer 306 associated with the motor 308 outputs a pulse. Thus, for example, if the number 1000 is entered into the display 300 indicating a desired motor frequency of 1000 RPM, every 1/60 of a second 1000 would be added to the counts in U/D counter 304 by entering this number of counts at the UP terminal thereof. If the motor actual speed were 1000 RPM, 1000/60 pulses per second would be generated by tachometer 306 and (1000/60)×3600 counts would be subtracted from the counts in U/D counter 304 by entering this number at the DN terminal thereof. It is clear that the error between the actual frequency, 1000/60 Hz, and the desired frequency, 1000 RPM, is zero. And, indeed, $$C_d \times 60 = f_d \times 3600$$

or $$1000 \times 60 = (1000/60) \times 3600 = 60000$$

where $C_d$ is the desired number of RPM, entered on display 300, and $f_d$ is the desired, and in this example, the actual frequency. It will be appreciated that if the motor frequency is anything other than 1000 RPM (1000/60 Hz), a count error will exist at the output terminal 312 from U/D counter 304. This error will drive the motor 308 controller 314 through a D/A converter 316. The U/D counter 304, D/A 316 and motor controller 314 can be as illustrated in the embodiments of FIGS. 1–3.

If the user wants the display in some form other than RPM, such as, for example, when the motor 308 is driving a fluid pump and gallons pumped per minute is the desired display, all that need be done is to subtract some number other than 3600 at the DN terminal of U/D counter 304 with each pulse from tachometer 306. That number would be, for example, 3600 times the number of gallons pumped per rotation of motor 308. If, for example, the pump driven by motor 308 pumped 0.02 gallons per revolution of motor 308, a system constant of 0.02×3600 or 72 counts, provided by a system constant multiplier block 317 would be supplied to the DN terminal of U/D counter 304 through a gate 318 each time tachometer 306 delivers a pulse to gate 318.

Figure 5:
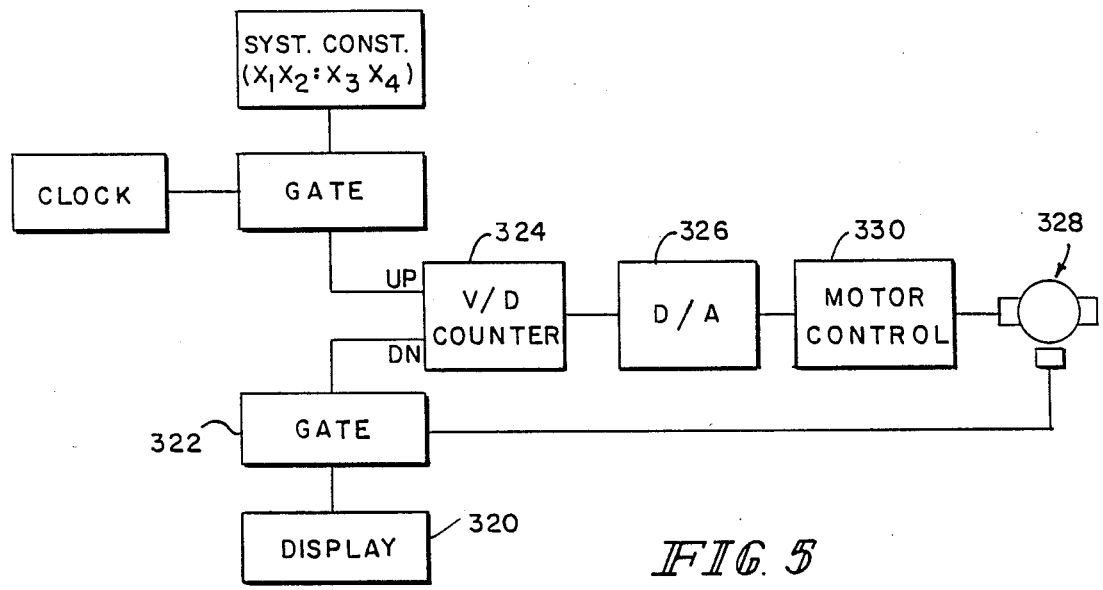
FIG. 5 illustrates a block diagram of a system constructed according to the invention.

Returning to the continuous pizza over example, if a user wanted to display the time a pizza had to be in the oven to cook, the embodiment illustrated in block diagram form in FIG. 5 would be useful. In this embodiment, a four-digit display 320 of minutes and seconds, for example, 08:30, is coupled through a gate 322 to the DN input of a U/D counter 324. As before, the output terminal of counter 324 is coupled to a D/A converter 326 the output of which drives a motor 328 through a motor controller 330. U/D counter 324, D/A 326, motor controller 330 and motor 328 can be as discussed in connection with all of the earlier embodiments. In the embodiment of FIG. 5, however, the desired cooking time in minutes and seconds is compared against a system constant, $X_1X_2:X_3X_4$, which is a function of the physical characteristics of the pizza oven. Why this is, and why the display is subtracted and a constant added by U/D counter 324, will be appreciated if it is appreciated that an increase in the display numbers means that the user wants the oven to slow down the rate at which the pizza advances through the oven rather than increase it.

Let it be assumed, for example, that for a particular oven being controlled by the embodiment of FIG. 5, the constant $X_1X_2:X_3X_4$ must be 11:54. That is, the gear ratio of the gear box driven from motor 328, which gear box in turn drives a conveyor chain on which pizzas are transported through the oven, as well as other oven characteristics dictate that the constant must be 11:54. If the desired cooking time for a pizza is 8:30, that means that every motor 328 rotation, 8:30 is subtracted from the count in U/D counter 324 and every 1/60 of a second 11:54 is added to the count in U/D counter 324. Now let it be assumed that the cooking time is to be reduced to 8:15. This requires a slight increase in motor 328 speed to get the pizza through the oven 15 seconds quicker. It will immediately be appreciated that the smaller number 8:15 will have to be subtracted from the up counts coming to the UP terminal counter 324 more often to reduce to zero the error output of the counter 324. This means that motor 328 will have to run faster, which it will do as a result of the initial error input from U/D counter 324 to D/A converter 326.

Figure 6:
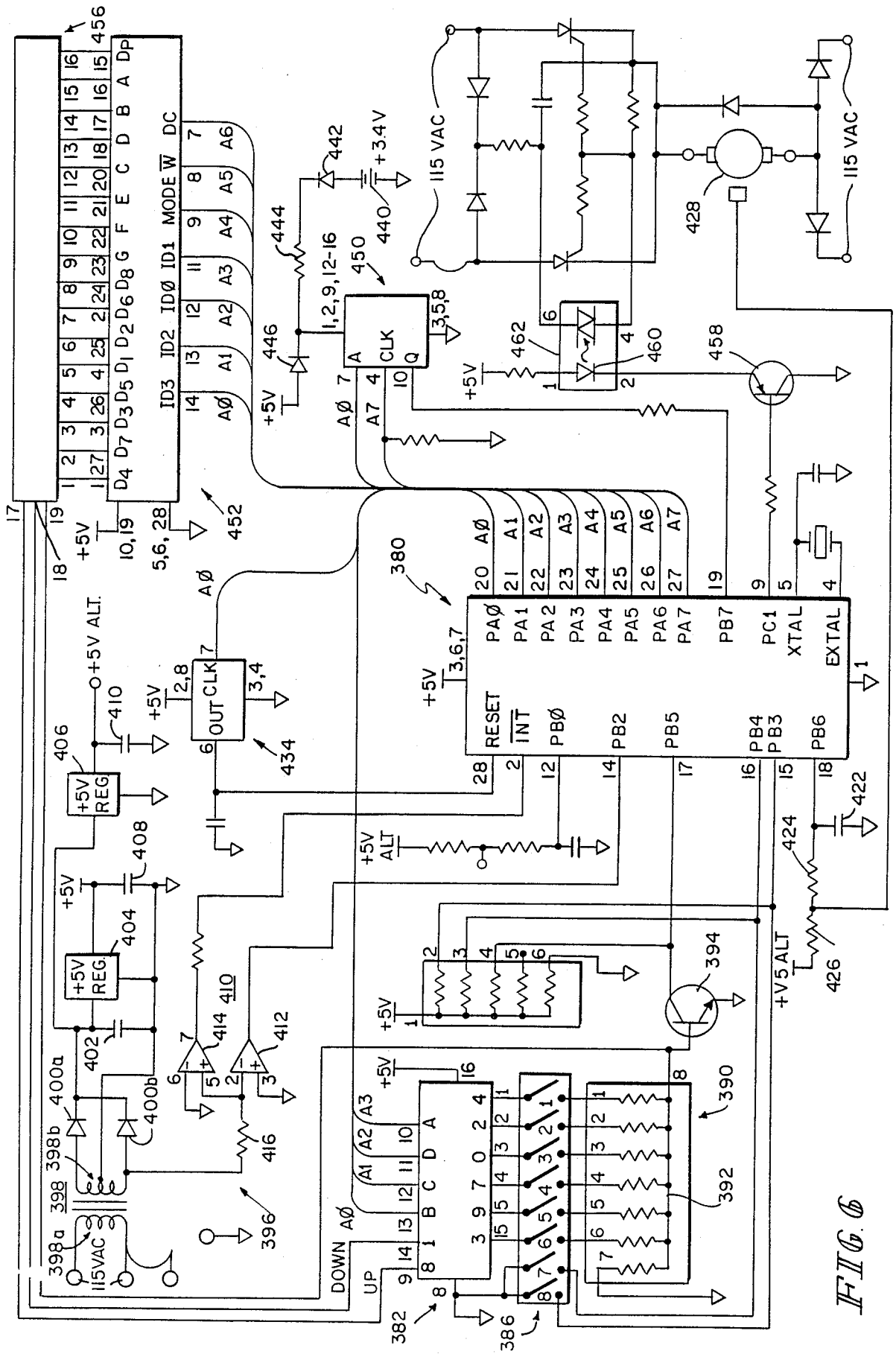
FIG. 6 illustrates a somewhat more detailed partly block and partly schematic diagram of a system constructed according to the invention.

FIG. 6 illustrates in partly block and partly schematic diagram form a combined hardware/software implementation of the systems of FIGS. 4 and 5. In the embodiment of FIG. 6, a microprocessor 380, such as a Motorola MC 68705 P3 controls the system's operation. A 4-to-16 decoder integrated circuit 382 includes system input terminals, pins 1–5 and 15. Illustratively, circuit 382 is an RCA type CD4028 integrated circuit and these pin numbers are the ones pertinent to this integrated circuit. These pins are coupled to terminals of respective switches 386-1-6 of an eight position dip switch 386. The remaining terminals of switches 386-1-6 are coupled through respective 10K resistors 390-1-6 to a common terminal 392. Terminal 392 is coupled through a 10K resistor 390-7 to ground. Terminal 392 is also coupled to the base of an NPN transistor 394, such as a type 2N4124. The emitter of transistor 394 is coupled to ground. The collector of transistor 394 is coupled through a 10K resistor to +5 VDC.

A power supply 396 includes a transformer 398, the primary winding 398a of which is coupled across the 115 VAC line. The secondary winding 398b is coupled to full wave rectifier diodes 400a–b. The cathodes of diodes 400a–b are coupled by a 1000 μF, 16 V storage capacitor 402 to a center tap of secondary winding 398b. The input terminals of a +5 VDC regulator 404, such as the type 7805 integrated circuit regulator, are coupled across capacitor 402. The input terminals of a +5 VDC regulator 406, such as a type 78L05A integrated circuit regulator, are coupled across capacitor 402. A 33 μF, 16 V capacitor 408 is coupled across the output terminals of regulator 404. A 150 μF, 16 V capacitor 410 is coupled across the output terminals of regulator 406.

A clock 410 includes two comparators 412, 414, such as type LM358 comparators. The "−" input terminal of comparator 412 and the "+" input terminal of comparator 414 are coupled through an 82K resistor 416 to the anode of diode 400b. The "+" input terminal of comparator 412 and the "−" input terminal of comparator 414 are coupled to ground. The output terminal of comparator 412 provides 60 Hz clock signals. The output terminal of comparator 414 provides 120 Hz clock signals.

Microprocessor 380 has its $\overline{INT}$ input terminal, pin 2, coupled to receive the 120 Hz clock signals from the output terminal of comparator 414 through a 1 ohm resistor. The 670 Hz clock signals on the output terminal of comparator 412 are coupled to the PB2 input terminal, pin 14, of microprocessor 380. The PB5 input terminal, pin 17, of microprocessor 380 is coupled to the collector of transistor 394. The PB3 and PB4 terminals, pins 15 and 16, respectively, of microprocessor 380 are coupled to terminals of switches 386-8 and 386-7, respectively, of switch 386, through respective 10K resistors to +5 V., and through a common 10K resistor to ground.

The PB6 input terminal, pin 18, of microprocessor 380 is coupled through a 0.01 μF, 100 V capacitor 422 to ground and through series 2.2K resistors 424, 426 to +5 V ALTERNATE. The junction of resistors 424 and 426 is coupled to a tachometer such as tachometer 306 of FIG. 4 or the tachometer of FIG. 5. Motor 428 rotation frequency signals are thereby provided to microprocessor 380. FIG. 6 also illustrates a provision for a reversible motor. In such a situation, an additional tachometer (not shown) and an additional input circuit similar to circuit 422, 424, 426 are provided on input terminal PBφ, pin 12, of microprocessor 380. The input signals from the tachometers coupled to input terminals PB6 and PBφ of microprocessor 380 will indicate not only motor 428 rotation frequency, but also motor 428 direction of rotation.

A 4 MHz crystal is coupled across terminals XTAL, EXTAL, pins 5 and 4, respectively, of microprocessor 380. Pin 5 is also coupled through a S20 pF, 100 V capacitor to ground. Terminals PAφ–PA7, pins 20–27, respectively, of microprocessor 380 form the system bus Aφ–A7 lines, respectively. The Aφ–A3 lines are coupled to terminals B, C, D and A, pins 13–10, respectively, of integrated circuit 382. The Aφ line is also coupled to the CLK input terminal, pin 7, of a "watchdog" integrated circuit 434, such as the Dallas Semiconductor type DS1232 integrated circuit. Circuit 434 is responsible for monitoring activity on the system bus and restarting the program in microprocessor 380 after a predetermined period of inactivity. Circuit 434 performs this function by outputting a reset pulse on its OUT terminal, pin 6, which is coupled to the RESET terminal, pin 28, of microprocessor 380. A 0.01 μF, 100 V capacitor is coupled between pin 28 of microprocessor 380 and ground.

When the pizza cooker or whatever appliance the circuit of FIG. 6 is controlling is turned off, the +5 V and +5 V ALTERNATE supplies ordinarily are designed so that they are turned off also. This means that power is not supplied to the microprocessor and the microprocessor "forgets" whatever data it was manipulating at the time power to it was interrupted. To avoid possible adverse effects of shutting off the equipment controlled by the circuit of FIG. 6, an auxiliary power source including a +3.4 VDC battery 440, a diode 442, a 10K resistor 444 and a diode 446 is provided. A series circuit including battery 440, diode 442 and resistor 444 is coupled to the cathode of diode 446. The anode of diode 446 is coupled to +5 V. The cathode of diode 446 is also coupled to pins 1, 2, 9 and 12–16 of a "housekeeping" integrated circuit shift register 450, such as Motorola type MC14557B integrated circuit. Any one of the Aφ–A 3 bus lines, in this case the Aφ line, is coupled to the A input terminal, pin 7, of integrated circuit 450. The A7 bus line is coupled to the CLK input terminal, pin 4, of integrated circuit 450, and through a 10K resistor to ground. The Q output terminal, pin 10, of circuit 450 is coupled through a 1 ohm resistor to the PB7 input terminal, pin 19, of microprocessor 420.

A display coordinator integrated circuit 452, such as the Maxum type ICM7218BIPI, has the A$\phi$-A6 bus lines coupled to its input terminals ID3, ID2, ID$\phi$, ID1, MODE, $\overline{W}$, DC, respectively, pins 14–11 and 9–7, respectively. The output terminals D4, D7, D3, D5, D1, D2, D6, D8, G, F, E, C, D, B, A, and DP, pins 1, 27, 3, 26, 4, 25, 2, 24–20 and 18–15, respectively, of display coordinator 452, are coupled to terminals 1–16, respectively, of a display 456. The display 456 is manufactured by Dart Controls inc., using siemens numerals, part number HD113308. The system UP and system DOWN lines couple pin 9 of circuit 382 to pin 17 of display 456, and pin 14 of circuit 382 to pin 18 of display 456, respectively. Pin 19 of display 456 is coupled to the base of transistor 394.

The trigger pulses which control motor 428 are provided from the PC1 terminal, pin 9, of microprocessor 380 through a 1K resistor to the base of a PNP transistor 458, which illustratively is a type 2N4126 transistor. The collector of transistor 458 is grounded. Its emitter is coupled to the cathode of an LED 460 in a combined LED-optically triggerable DIAC package 462, such as the MOC 3009 package. The circuitry for controlling the motor 428 otherwise is as illustrated in FIG. 3 and described in the discussion of that figure.

The source code for microprocessor 380 is EXHIBIT A.

DART CONTROLS, INC. is manufacturer of display. We use Siemens P/N HD113308 numerals. Numerals are purchased from Advent Electronics.

What is claimed is:

1. An apparatus for controlling a motor, the apparatus comprising
    an oscillator for providing a source of periodic signals;
    means for converting the oscillator output into desired motor rotation frequency signals;
    means for generating actual motor rotation frequency signals;
    means for comparing the actual and desired motor rotation frequency signals and for generating a rotation frequency error signal;
    means for controlling motor rotation frequency;
    means for coupling the oscillator to the means for converting the oscillator output into desired motor rotation frequency signals;
    means for coupling the means for converting the oscillator output into desired motor rotation frequency signals to the means for comparing the actual and desired motor rotation frequency signals and for generating a rotation frequency error signal;
    means for coupling the means for comparing the actual and desired motor rotation frequency signals and for generating a rotation frequency error signal to the means for controlling motor rotation frequency;
    means for coupling the means for generating actual motor rotation frequency signals to the means for comparing the actual and desired motor rotation frequency signals and for generating a rotation frequency error signal;
    means for generating a counting gate during which signals are to be counted;
    means for counting signals;
    means for displaying the number of signals counted during the counting gate;
    means for coupling at least one of the means for generating a counting gate and the oscillator to the means for counting signals; and
    means for coupling the signal count display means to the means for counting signals.

2. The apparatus of claim 1 wherein the means for coupling at least one of the means for generating a counting gate and the oscillator to the means for counting the signals comprises means for coupling both the means for generating a counting gate and the oscillator to the means for counting the signals.

3. The apparatus of claim 2 wherein the means for coupling the oscillator to the means for counting the signals comprises means for converting the oscillator output into signals at a desired counting rate;
    means for coupling the oscillator to the means for converting the oscillator output into signals at a desired counting rate; and
    means for coupling the means for converting the oscillator output into signals at a desired counting rate to the means for counting signals.

4. The apparatus of claim 3 wherein the means for coupling both the means for generating a counting gate and the oscillator to the means for counting the signals comprises an AND gate;
    means for coupling the means for converting the oscillator output into signals at a desired rate to the AND gate; and
    means for coupling the AND gate to the means for counting the signals.

5. The apparatus of claim 4 and further comprising means for coupling the means for generating a counting gate to the AND gate.

6. The apparatus of claim 5 wherein the means for generating a counting gate comprises a second source of periodic signals.

7. The apparatus of claim 6 wherein the means for generating a counting gate further comprises means for converting signals from the second source of periodic signals into signals at a desired gate rate;
    means for coupling the second source of periodic signals to the means for converting signals from the second source of periodic signals into signals at the desired gate rate; and
    means for coupling the means for converting signals from the second source into signals at the desired gate rate to the AND gate.

8. The apparatus of claim 2 wherein the means for coupling both the means for generating a counting gate and the oscillator to the means for counting the signals comprises an AND gate;
    means for coupling the oscillator to the AND gate; and
    means for coupling the AND gate to the means for counting the signals.

9. The apparatus of claim 8 and further comprising means for coupling the means for generating a counting gate to the AND gate.

10. The apparatus of claim 9 wherein the means for generating a counting gate comprises a second source of periodic signals.

11. The apparatus of claim 10 wherein the means for generating a counting gate further comprises means for converting signals from the second source of periodic signals into signals at a desired gate rate;

means for coupling the second source of periodic signals to the means for converting signals from the second source of periodic signals into signals at the desired gate rate; and means for coupling the means for converting signals from the second source into signals at a desired gate rate to the AND gate.

12. The apparatus of claim 2 wherein the means for coupling both the means for generating a counting gate and the oscillator to the means for counting the signals comprises an AND gate;

means for coupling the means for generating a counting gate to the AND gate; and means for coupling the AND gate to the means for counting the signals.

13. The apparatus according to claim 12 wherein the means for generating a counting gate comprises a second source of periodic signals.

14. The apparatus according to claim 13 wherein the means for generating a counting gate further comprises means for converting signals from the second source of periodic signals into signals at a desired gate rate;

means for coupling the second source of periodic signals to the means for converting signals into signals at the desired gate rate; and means for coupling the means for converting signals from the second source into signals at a desired gate rate to the AND gate.

15. The apparatus of claim 1 wherein the means for coupling at least one of the means for generating a counting gate and the oscillator to the means for counting the signals comprises means for coupling the means for generating a counting gate to the means for counting the signals.

16. The apparatus of claim 15 and further comprising means for coupling the oscillator to the means for generating a counting gate.

17. The apparatus of claim 16 wherein the means for generating a counting gate comprises means for converting the oscillator output into signals at a desired gate rate.

18. The apparatus of claim 17 wherein the means for coupling the means for generating a counting gate to the means for counting the signals comprises an AND gate;

means for coupling the means for converting the oscillator output into signals at a desired gate rate to the AND gate; and means for coupling the AND gate to the means for counting the signals.

19. The apparatus of claim 21 and further comprising means for generating signals at a desired counting rate; and means for coupling the means for generating signals at a desired counting rate to the AND gate.

20. The apparatus of claim 18 wherein the means for generating signals at a desired counting rate further comprises means for converting line rate signals into signals at a desired counting rate;

means for coupling the line to the means for converting line rate signals into signals at a desired counting rate; and means for coupling the means for converting signals at a desired counting rate to the AND gate.

21. The apparatus of claim 15 further comprising a second source of periodic signals for providing signals to be counted; and means for coupling the second source of periodic signals to the means for counting the signals.

22. The apparatus of claim 21 wherein the means for coupling the second source of periodic signals to the means for counting the signals comprises an AND gate.

23. The apparatus of claim 22 wherein the means for coupling the second source of periodic signals to the means for counting the signals further comprises means for converting signals from the second source of periodic signals to signals at the counting rate;

means for coupling the means for converting signals from the second source of periodic signals to signals at the counting rate to the second source of signals; and means for coupling the means for converting signals from the second source of periodic signals to signals at the counting rate to the AND gate.

24. The apparatus of claim 23 wherein the means for coupling the means for generating a counting gate to the means for counting signals comprises means for coupling the means for generating a counting gate to the AND gate.

25. Apparatus for controlling the rotation frequency of an electric motor, the apparatus comprising;

an up/down (U/D) counter;

a motor controller;

means for coupling the U/D counter to the motor controller;

means for generating first signals corresponding to actual motor rotation frequency;

means for generating second signals corresponding to desired motor rotation frequency;

means for generating a system constant corresponding to physical parameters of the apparatus;

a first gate;

a second gate;

a clock;

means for coupling the means for generating the first signals to the first gate;

means for coupling the clock to the second gate;

means for coupling the first gate to one of the UP and DOWN terminals of the U/D counter;

means for coupling the second gate to the other of the UP and DOWN terminals of the U/D counter;

means for coupling the means for generating a system constant to one of the first and second gates; and means for coupling the means for generating the second signals to the other of the first and second gates.

26. The apparatus of claim 25 wherein the means for generating the first signals comprises a tachometer.

27. The apparatus of claim 25 wherein the means for generating second signals corresponding to desired motor rotation frequency comprises a display, a display driver, means for slewing the display up and down, means for coupling the display-slewing means to the display driver, and means for coupling the display driver to the display.

28. The apparatus of claim 27 wherein the means for coupling the display-slewing means to the display driver comprises a microprocessor.

29. The apparatus of claim 28 and further comprising an auxiliary power supply, means for storing signals corresponding to the display, means for coupling the auxiliary power supply to the means for storing signals corresponding to the display, and means for coupling the means for storing signals corresponding to the display to the microprocessor.

30. The apparatus of claim 27 wherein the means for coupling the first gate to one of the UP and DOWN terminals of the U/D counter comprises means for coupling the first gate to the DOWN terminal, and the means for coupling second gate to the other of the UP and DOWN terminals of the U/D counter comprises means for coupling the second gate to the UP terminal of the U/D counter.

31. The apparatus of claim 30 wherein the means for coupling the means for generating a system constant to one of the first and second gates comprises means for coupling the means for generating a system constant to the second gate, and the means for coupling the means for generating the second signals to the other of the first and second gates comprises means for coupling the means for generating the second signals to the first gate.

32. The apparatus of claim 30 wherein the means for coupling the means for generating a system constant to one of the first and second gates comprises means for coupling the means for generating a system constant to the first gate, and the means for coupling the means for generating the second signals to the other of the first and second gates comprises means for coupling the means for generating the second signals to the second gate.

* * * * *

UNITED STATES PATENT AND TRADEMARK OFFICE
CERTIFICATE OF CORRECTION

PATENT NO. : 4,873,473
DATED : October 10, 1989
INVENTOR(S) : Paul E. Penn et al.

It is certified that error appears in the above-identified patent and that said Letters Patent is hereby corrected as shown below:

At column 3, line 34, please delete "AB = 120 (100/60) 51/120" and insert therefor --AB = 120 (1000/60) 51/120--;

At column 5, line 20, please delete "36/60 x 1000,000/60 = 1000" and insert therefor --36/60 x 100,000/60 = 1000--;

At column 6, line 20, please delete "condition" and insert therefor --conduction--;

At column 8, line 47, please delete "over" and insert therefor --oven--;

At column 9, line 17, after the word "terminal", please insert the word --of--;

At column 9, line 32, please delete "386-1-6" and insert therefor --386-1--6--;

At column 9, line 34, please delete "1-6" and insert therefor --1--6--;

At column 9, line 35, please delete "1-6" and insert therefor --1--6--;

UNITED STATES PATENT AND TRADEMARK OFFICE
CERTIFICATE OF CORRECTION

PATENT NO. : 4,873,473

DATED : October 10, 1989

INVENTOR(S) : Paul E. Penn et al.

It is certified that error appears in the above-identified patent and that said Letters Patent is hereby corrected as shown below:

At column 13, line 52, please delete "21" and insert therefor --18--; and

At column 13, line 57, please delete "18" and insert therefor --19--.

Signed and Sealed this

Thirteenth Day of November, 1990

Attest:

HARRY F. MANBECK, JR.

*Attesting Officer*  *Commissioner of Patents and Trademarks*